United States Patent [19]
Hazen

[11] 4,300,446
[45] Nov. 17, 1981

[54] APPARATUS FOR SALTING CHEESE

[75] Inventor: Gretz L. Hazen, Fort Atkinson, Wis.

[73] Assignee: DEC International, Inc., Madison, Wis.

[21] Appl. No.: 23,079

[22] Filed: Mar. 23, 1979

[51] Int. Cl.³ .................... A01J 25/02; A01J 25/10
[52] U.S. Cl. .......................... 99/461; 99/456; 99/494; 366/154; 366/168; 366/174; 366/289; 406/137; 406/144
[58] Field of Search ................. 99/452–466, 99/494, 535, 348; 366/154, 155, 168, 169, 174, 289; 222/526; 406/137, 144, 146

[56] References Cited

U.S. PATENT DOCUMENTS

| | | | |
|---|---|---|---|
| 485,986 | 11/1892 | Saladin | 366/168 |
| 1,458,341 | 6/1923 | Herbert | 406/144 |
| 2,774,140 | 12/1956 | Nessler et al. | 99/453 |
| 2,919,159 | 12/1959 | Lacroix | 406/137 |
| 4,112,517 | 9/1978 | Giombini | 366/168 |

FOREIGN PATENT DOCUMENTS 1318863 5/1973 United Kingdom ................ 99/494

Primary Examiner—Philip R. Coe
Assistant Examiner—Timothy F. Simone
Attorney, Agent, or Firm—Andrus, Sceales, Starke & Sawall

[57] ABSTRACT

An apparatus for salting cheese. A tank containing a quantity of salt is located outside of the finishing vat that contains the cheese curd. The curd in the vat is agitated by stirring paddles which are mounted on a rotating arm and one end of a salt supply line is connected to the bottom portion of the salt tank while the opposite end of the line is connected to the rotating arm within the vat. A pressure line, connected to a source of gas under pressure, is also connected to the bottom portion of the salt tank, opposite the connection of the salt supply line. The pressure line has a smaller diameter than the supply line and gas is jetted through the salt bed, causing salt to be drawn into the fast moving gas stream and delivered through the supply line to the vat where it is uniformly distributed onto the curds.

5 Claims, 4 Drawing Figures

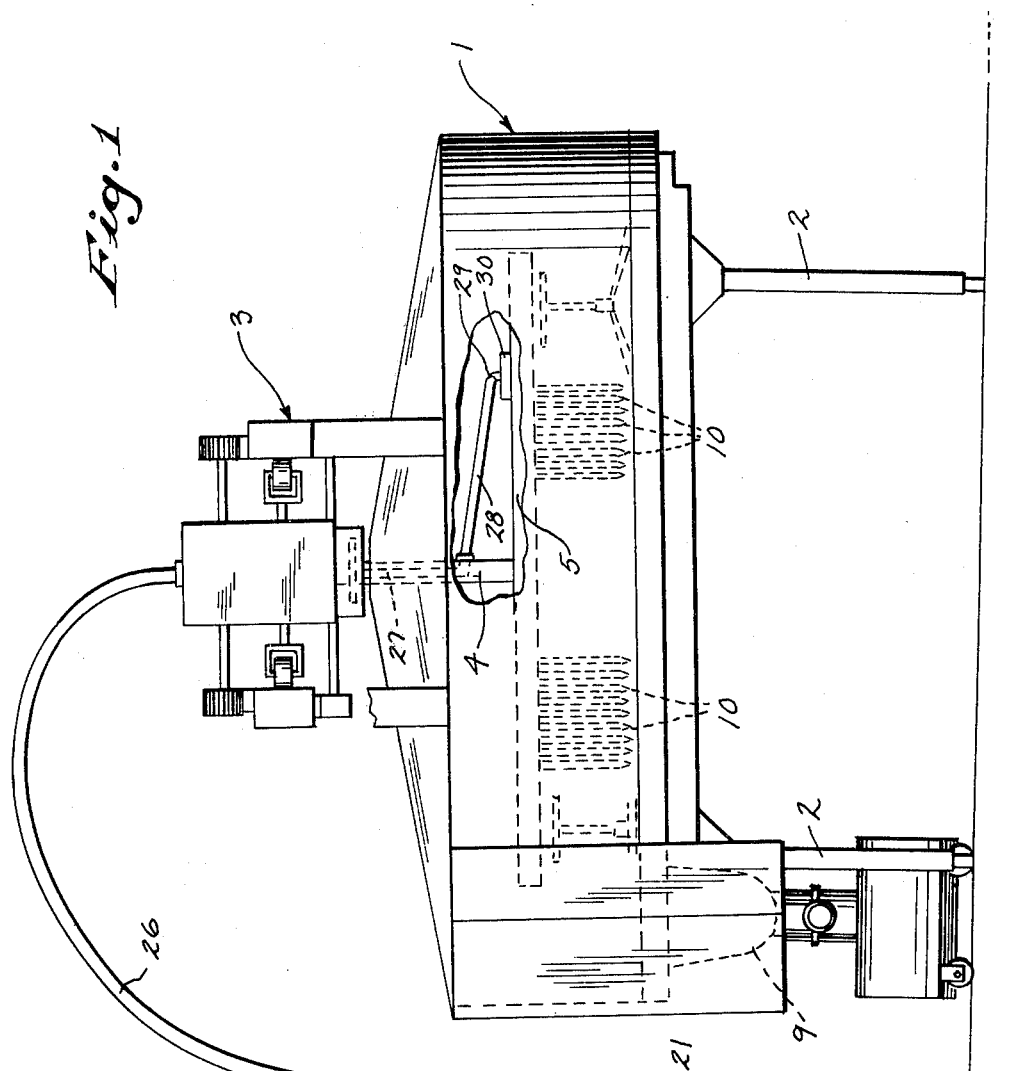
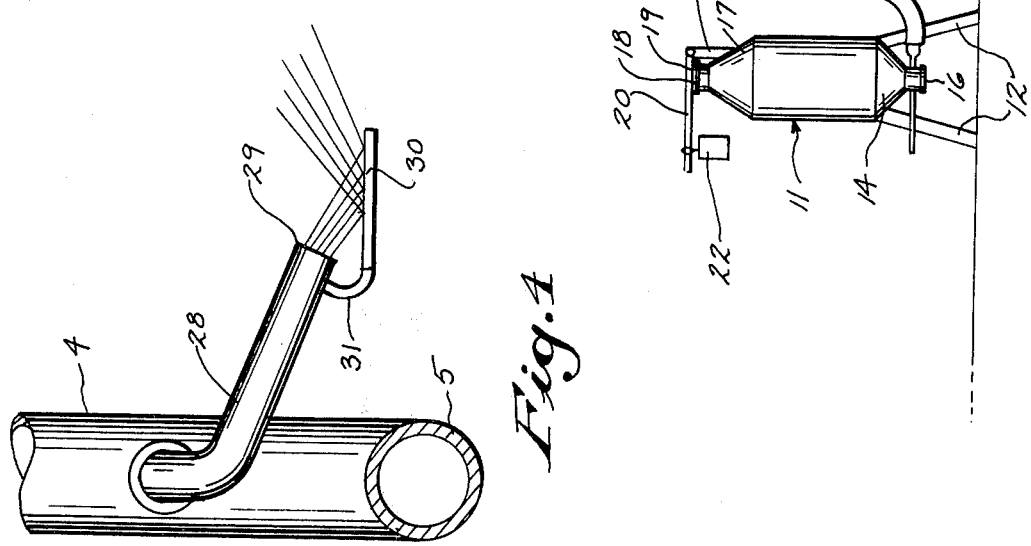

APPARATUS FOR SALTING CHEESE

BACKGROUND OF THE INVENTION

In the conventional cheese making process for producing cheddar, colby or stirred curd cheese, the curd and whey are transferred from the cheese making vat to a finishing vat where the curd is slowly agitated and the whey is drawn off. Subsequently, the cheddar-type curd is milled and the moist curd is agitated by forking paddles which travel the length of the vat on a reciprocating carriage. During the process, salt is sprinkled onto the curds in the finishing vat, and the salt serves to expel whey from the curds and to cure the cheese. In order to obtain uniform curing of the cheese, the salt should be precisely and uniformly applied to the curds. As the amount of salt to be used is very small in relation to the volume of the curds, difficulties arise in obtaining a uniform and controlled distribution of salt.

The normal procedure for salting, as used in the past, has been to apply the salt manually by splashing the salt by hand from a bucket onto the curds. This manual method produces a non-uniform application of salt in which certain portions of the curds are oversalted, while other portions may be undersalted.

Various devices have been suggested in the past for providing automatic salting. For example, U.S. Pat. No. 2,942,343 shows a device for salting cheese curds in which the cheese curds move along an inclined strainer and whey is drained from the curds and simultaneously salt from a container is applied to the moving layer of curds.

In the U.S. Pat. No. 466,048 the curds are located in a revolving, dish-shaped table and a salter is mounted above the table. A drive mechanism simultaneously rotates the working table and drives the salter to distribute salt over the curds.

SUMMARY OF THE INVENTION

The invention is directed to an improved apparatus for salting cheese which accurately controls the amount of salt applied to the cheese curds.

In accordance with the invention, a quantity of salt is contained within a tank or vessel located outside of the finishing vat and the lower end of the salt tank is connected by a flexible hose to the agitating unit which serves to agitate the curds in the vat. The discharge end of the salt delivery hose is connected to the rotating arm of the agitating unit which supports the cheese making implements, and as the arm rotates, the salt is distributed in a uniform manner over the cheese curds.

To deliver the salt through the delivery hose, a pneumatic ejector type of mechanism is utilized. In this regard, a pressure line, connected to a source of gas under pressure, communicates with the lower end of the salt tank and is spaced from the end of the salt delivery line. The pressure line has a smaller diameter than the salt delivery line with the result that a stream of high velocity gas will pass through the lower end of the salt tank, causing a pressure differential to draw the salt into the fast moving stream of gas for delivery to the finishing vat.

The invention provides a controlled and uniform distribution of salt onto the curds, without the salt contacting the side walls of the vat.

The salt tank incorporates a novel pressure relief mechanism in which the cover on the salt tank will be moved to an open position if the pressure within the tank increases to a predetermined value due to a blockage in the salt delivery line.

Other objects and advantages will appear in the course of the following description.

DESCRIPTION OF THE DRAWINGS

The drawings illustrate the best mode presently contemplated of carrying out the invention.

In the drawings:

FIG. 1 is an end view of a finishing vat incorporating the salting apparatus of the invention;

FIG. 4 is an enlarged fragmentary vertical section showing the discharge end of the salt line and the deflector plate.

DESCRIPTION OF THE PREFERRED EMBODIMENT

Figure 2:
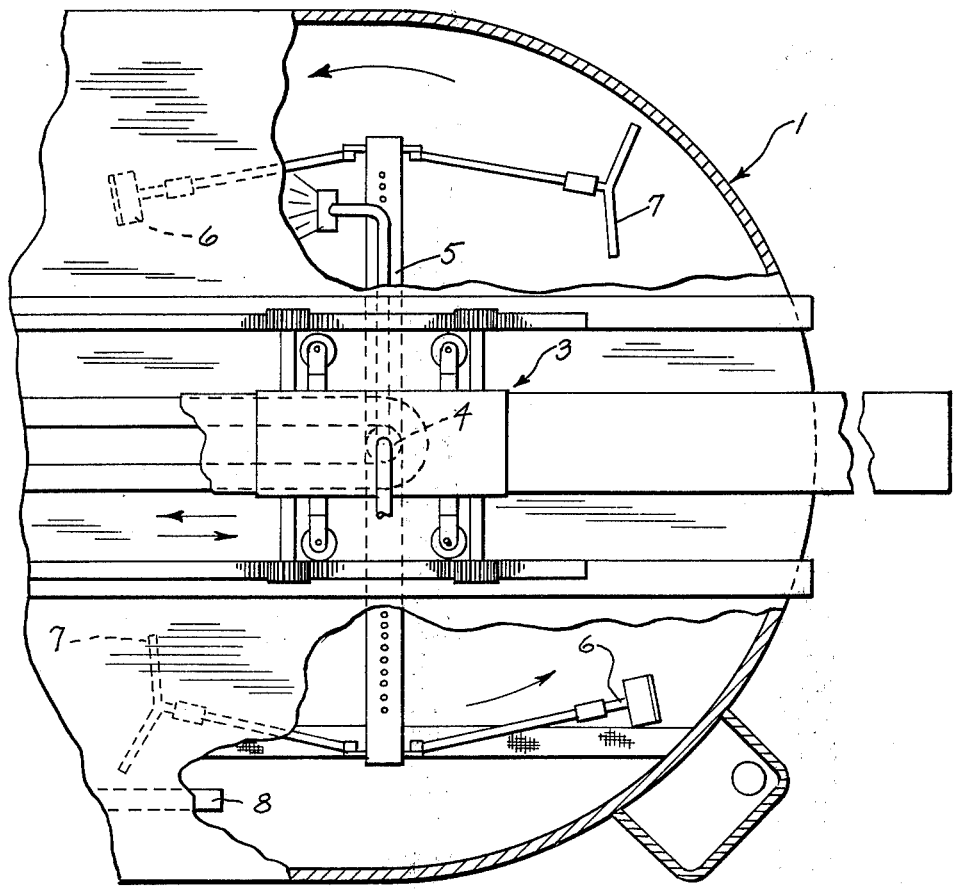
FIG. 2 is a fragmentary top plan view of the finishing vat with parts broken away in section.

FIGS. 1 and 2 show an enclosed finishing vat 1, as described in the copending application, Ser. No. 020,803 filed Mar. 15, 1979, abandoned of the same inventor, entitled Enclosed Finishing Vat For Cheese Making, and the construction of the vat as described in the aforementioned patent application is incorporated by reference herein.

The vat 1 is supported from the ground or foundation by a series of legs 2 and an agitating unit, indicated generally by 3, is mounted above the vat and serves to agitate or stir the curds in the vat and to discharge the curds from the vat. In operation, the agitator unit 3 is designed to travel in a reciprocating path along the length of the vat and the agitator unit includes a vertical drive shaft 4, which carries at its lower end a cross arm 5. As described in the aforementioned patent application, both a stirring paddle 6 and a loading paddle 7 are mounted on each end of the cross arm 5 and extend generally in opposite directions from the respective end of the arm. When the shaft 4 and cross arm 5 are rotated in the direction of the solid arrow in FIG. 2, the stirring paddles 6 act to stir the curd, while the unloading paddles 7 will ride on the curd and serve to break up clumps of the curds. When the direction of rotation of the shaft 4 is reversed, the unloading paddles will lead in the direction of rotation and push the curds to the discharge opening 8 located in the bottom wall of the vat where the curds are discharged into a hopper 9.

In addition to the stirring paddles 6 and unloading paddles 7, the cross arm 5 is provided with a series of raking rods 10 which are pivoted at their upper ends to the cross arm 5.

Figure 3:
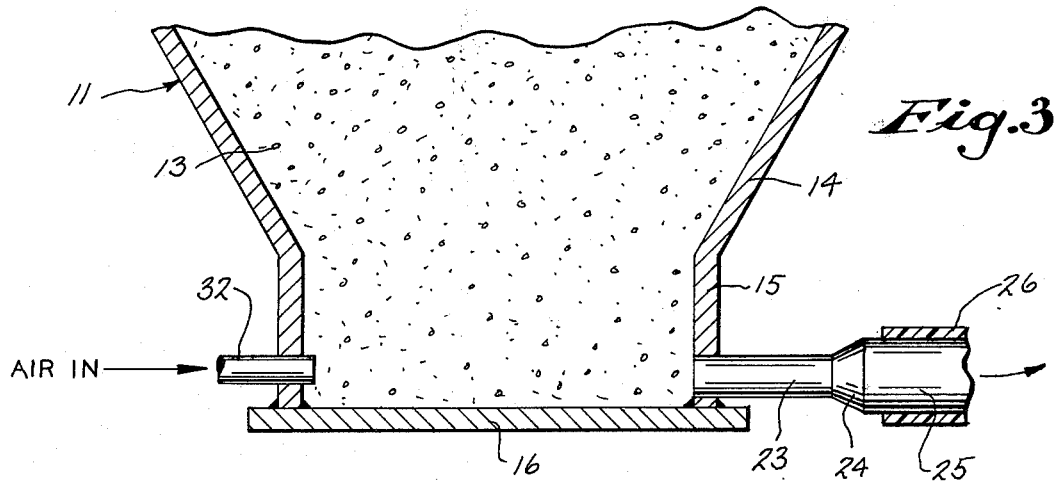
FIG. 3 is an enlarged fragmentary vertical section showing the lower end of the salt tank.

In accordance with the invention, an apparatus is provided for automatically and uniformly applying salt to the cheese curds within the vat 1. The salting operation includes a tank 11 which is located outside of the vat 1 and the tank is mounted on legs 12 and contains a quantity of salt crystals 13. The salt has a small particle size, similar to that of table salt, and is in a dry condition to minimize bridging in the tank. As shown in FIG. 3, the tank 11 has a tapered or hopper-type of bottom 14 which terminates in a smaller diameter end portion 15, the bottom end of which is enclosed by plate 16. Similarly, the upper end of tank 11 has a tapered section 17 which terminates in a neck 18. The upper open end of neck 18 is enclosed by a cover or lid 19 that is carried by the horizontal arm 20. As shown in FIG. 1, one end of the arm 20 is pivotally connected to a bracket 21 connected to the tapered section 17, while the opposite end of the arm 20 carries a weight 22. The weight 22 will normally hold the cover 19 in the closed position, but if the pressure within the tank 11 increases beyond a predetermined value, the pressure will open the cover 19 against the force of the weight 22 to thereby provide a pressure relief mechanism.

To deliver the salt from the tank 11 to the vat 1, a tube 23 is mounted within an opening in the smaller diameter section 15 of the tank, and tube 23 is flared outwardly through a tapered section 24 to an outer larger diameter section 25 that is connected by a flexible hose 26 to the agitator unit 3. Hose 26 is in communication with an axial opening 27 in shaft 4 through a conventional rotary seal and the lower end of the opening 27 connects with a conduit 28. The outer or discharge end 29 of conduit 28 is mounted adjacent one end of the cross arm 5, and the salt being conveyed through the delivery line 26 is discharged from the end 29 and is deflected in a spray pattern by a deflector plate 30 over the curds located within the vat as the cross arm rotates. As shown in FIG. 4, the deflector plate 30 is mounted from the conduit 28 through a bracket 31.

As illustrated in FIG. 3, a pressure line 32 is also mounted within an opening in the lower end section 15 of the salt tank 11, and the pressure line 32 is spaced from, and in axial alignment with, the tube 23. As shown in FIG. 3, pressure line 32 has a smaller diameter than delivery tube 23. The outer end of the pressure line 32 is connected to a source of air or other gas under pressure, and a high velocity stream of air is discharged from line 32 into the lower end of the salt bed, providing a type of ejector action to create a decrease in pressure and draw the salt into the fast moving air stream for delivery through the line 26. In practice, the salt is moved through the delivery line 26 in the form of small slugs, and is discharged from end 29 against plate 30 so that the salt is sprayed in a uniform pattern over the curds as the arm 5 rotates.

As the salt tank 21 is located outside of the vat, it is in a position where it can be readily filled with salt and serviced. The flexible line 26 accommodates the reciprocating motion of the agitating unit 3 as it moves back and forth along the length of the vat. The high velocity pneumatic delivery aids in providing a uniform distribution of salt, enabling the salt crystals to contact substantially the entire surface of the curds, and through operation of the stirring paddles the salt will be mixed throughout the curd mass.

While the above description has shown the salting device of the invention as associated with a closed top vat, it is contemplated that the device can also be used with an opentop vat or vats of other constructions.

Various modes of carrying out the invention are contemplated as being within the scope of the following claims particularly pointing out and distinctly claiming the subject manner which is regarded as the invention.

I claim:

1. A cheese making apparatus, comprising a vat to contain cheese curds, an agitating unit mounted for reciprocating motion above the vat and including a vertical drive shaft and a rotating arm connected to the lower end of the drive shaft, agitating implements connected to said arm and disposed to agitate the curds in the vat as the arm is rotated, a salt tank disposed outside of the vat and containing a bed of salt, an uninterrupted pressurized delivery conduit having one end connected to the bottom portion of the salt tank and spaced above the bottom of the salt bed and the opposite end connected to said arm, said delivery conduit having a portion disposed coaxially of said shaft, and a pressure conduit connected to a source of gas under pressure and communicating with the bottom portion of said salt tank and spaced above the bottom of the salt bed for supplying a high velocity stream of gas into contact with the salt in said tank, said pressure conduit being spaced from said delivery conduit and being in general axial alignment therewith, said pressure conduit having a smaller diameter than said delivery conduit, said high velocity stream of gas creating a decrease in pressure in said bottom portion of the tank to draw salt into the high velocity stream for delivery of said gas and salt under positive pressure through the entire length of said delivery conduit to said vat.

2. The apparatus of claim 1, and including a deflector member connected to said opposite end of the delivery conduit, said deflector member being located in the path of salt being delivered from said opposite end and serving to deflect the salt in a spray pattern over the curds in the vat.

3. The apparatus of claim 1, and including a pressure relief mechanism connected to the salt tank for opening the salt tank to the atmosphere when the pressure within the tank exceeds a predetermined value.

4. The apparatus of claim 3, wherein said salt tank is provided with an opening in the upper portion thereof, and said pressure relief mechanism includes a cover to normally enclose said opening, and a weight suspended from said cover and acting to maintain the cover in a closed position, an increase in pressure in said tank acting to overcome the force of said weight to open said opening and relieve the pressure within the tank.

5. The apparatus of claim 1, wherein said delivery conduit is flexible to accommodate reciprocating movement of the agitating unit.

* * * * *